(12) United States Patent
Eder et al.

(10) Patent No.: US 11,919,217 B2
(45) Date of Patent: Mar. 5, 2024

(54) SYSTEM FOR PRODUCING A CAST FILM, AND FILM STRETCHING INSTALLATION WITH SUCH A SYSTEM

(71) Applicant: BRÜCKNER MASCHINENBAU GmbH, Siegsdorf (DE)

(72) Inventors: Christoph Eder, Kolbermoor (DE); Andreas Gärtz, Erlstätt (DE); Korbinian Kaspar, Freilassing (DE); Anton Edfelder, Unterwössen (DE); Ferdinand Weber, Obing (DE)

(73) Assignee: BRÜCKNER MASCHINENBAU GmbH, Siegsdorf (DE)

(*) Notice: Subject to any disclaimer, the term of this patent is extended or adjusted under 35 U.S.C. 154(b) by 14 days.

(21) Appl. No.: 17/609,689

(22) PCT Filed: Apr. 8, 2020

(86) PCT No.: PCT/EP2020/060062
§ 371 (c)(1),
(2) Date: Nov. 8, 2021

(87) PCT Pub. No.: WO2020/224908
PCT Pub. Date: Nov. 12, 2020

(65) Prior Publication Data
US 2022/0258400 A1    Aug. 18, 2022

(30) Foreign Application Priority Data
May 9, 2019    (DE) .................... 10 2019 112 077.2

(51) Int. Cl.
*B29C 48/08*    (2019.01)
*B29C 48/00*    (2019.01)
(Continued)

(52) U.S. Cl.
CPC .......... *B29C 48/08* (2019.02); *B29C 48/0018* (2019.02); *B29C 48/305* (2019.02);
(Continued)

(58) Field of Classification Search
None
See application file for complete search history.

(56) References Cited

U.S. PATENT DOCUMENTS 3,571,853 A    3/1971    Melton et al.
3,982,863 A    9/1976    Latham et al.

FOREIGN PATENT DOCUMENTS

DE    23 24 345        11/1973
JP    49-55759 A       5/1974
(Continued)

OTHER PUBLICATIONS

Machine Translation of Rutz et al. (WO2009-127197) (Year: 2009).*
(Continued)

*Primary Examiner* — Robert J Grun
(74) *Attorney, Agent, or Firm* — Nixon & Vanderhye P.C.

(57) ABSTRACT

A line for producing a cast film is disclosed having a slot die, a chill roll, an electrode assembly, an insulator assembly, a sensor device, and a control device. The electrode assembly is arranged between an impingement area of the cast film on the chill roll and a removal area. The insulator assembly is arranged between the electrode assembly and the chill roll shell. The sensor device continuously determines the left and right cast film edge. According to the determined left and right cast film edge the control device moves the insulator assembly in such a way that the insulator assembly is arranged: a) between the left end face of the chill roll and the left cast film edge; and b) between the right end face of the chill roll and the right cast film edge.

16 Claims, 11 Drawing Sheets

Figure 1:
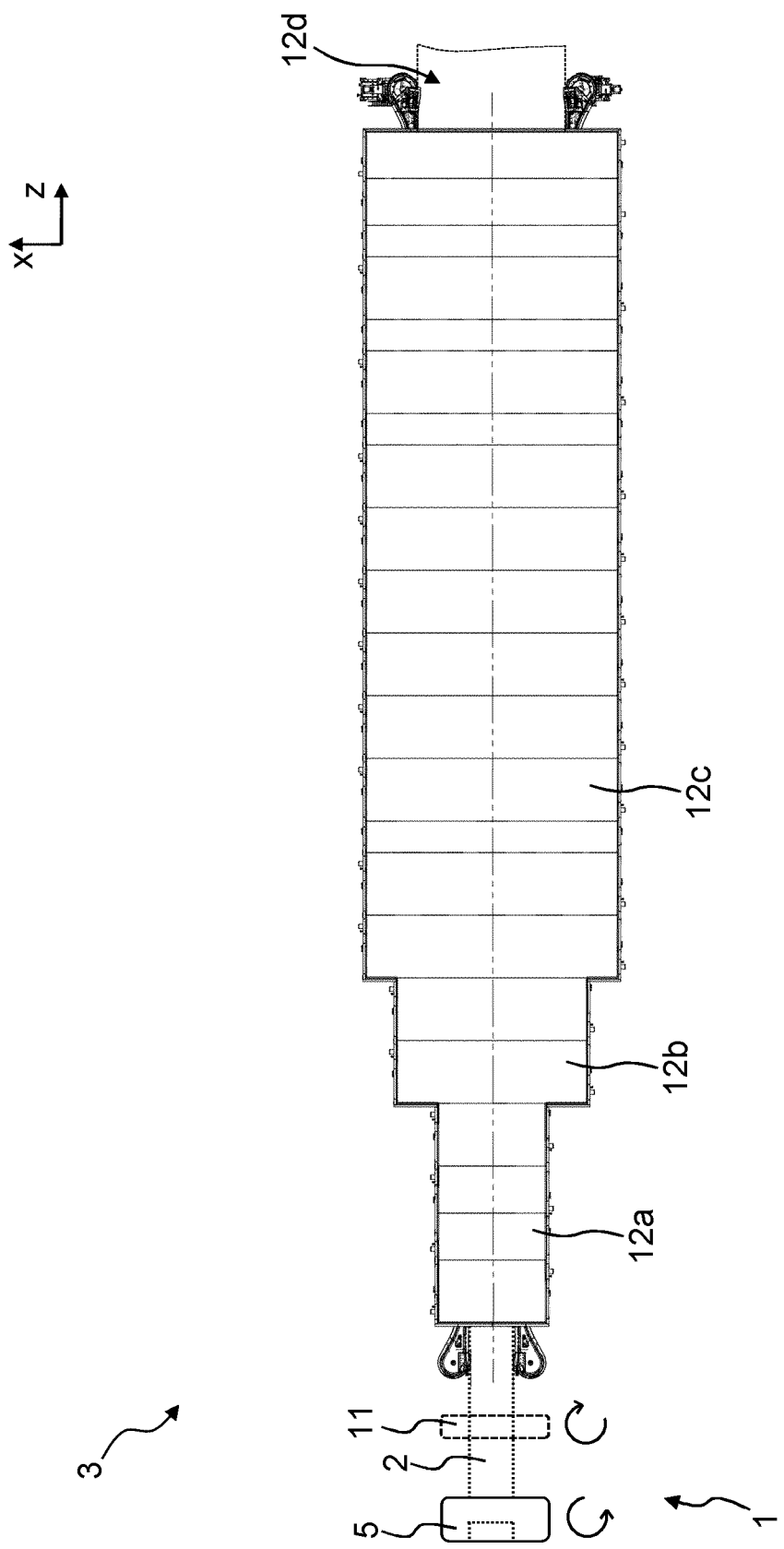

(51) Int. Cl.
    *B29C 48/305*     (2019.01)
    *B29C 48/88*     (2019.01)
    *B29C 48/92*     (2019.01)
    *B29C 55/02*     (2006.01)

(52) U.S. Cl.
    CPC ............ *B29C 48/914* (2019.02); *B29C 48/92* (2019.02); *B29C 55/02* (2013.01); *B29C 2948/92114* (2019.02); *B29C 2948/92209* (2019.02); *B29C 2948/92466* (2019.02); *B29C 2948/92961* (2019.02)

(56) References Cited

FOREIGN PATENT DOCUMENTS

| | | |
|---|---|---|
| JP | 49-116160 A | 11/1974 |
| JP | S 55-34957 | 3/1980 |
| JP | 1-275118 A | 11/1989 |
| JP | 11-944 A | 1/1999 |
| JP | 11-268101 A | 10/1999 |
| JP | 2002-219723 A | 8/2002 |
| JP | 39-08867 B | 4/2007 |
| JP | 2010-269550 A | 12/2010 |
| JP | 2013-10301 A | 1/2013 |
| JP | 55-34957 A | 7/2014 |
| KR | 10-2006-0021729 | 3/2006 |
| WO | 2009/127197 | 10/2009 |

OTHER PUBLICATIONS

English Translation of the International Preliminary Report on Patentability and Written Opinion of the ISA for Application No. PCT/EP2020/060062, nine pages, dated Nov. 18, 2021.
German International Search Report and Written Opinion of the ISA for PCT/EP2020/060062, dated Jun. 19, 2020, 10 pages.
English Translation of the International Search Report for PCT/EP2020/060062, dated Jun. 19, 2020, 2 pages.
Japanese Office Action and English Machine Translation for Japanese Application No. 2021-566161, three pages, dated Dec. 6, 2023.

* cited by examiner

SYSTEM FOR PRODUCING A CAST FILM, AND FILM STRETCHING INSTALLATION WITH SUCH A SYSTEM

CROSS REFERENCE TO RELATED APPLICATIONS

The present application is a National Phase of International Application Number PCT/EP2020/060062 filed Apr. 8, 2020, which designated the U.S. and claims priority benefits from German Application Number DE 10 2019 112 077.2 filed May 9, 2019, the entire contents of each of which are hereby incorporated by reference.

The invention relates to a line for producing a cast film and a film stretching unit comprising such a line.

For the production of films, the starting materials are usually fed into an extruder where they are liquefied by heating. This plastic melt is then pressed through a wide slot tool, which can also be referred to as a slot die. This plastic melt is then applied to or output onto a cooled roller (=chill roll).

After that, the plastic melt which is output onto the chill roll, which can also be referred to as cast film or melt film, is then fed via further rollers to additional units which stretch the cast film in the longitudinal direction and/or in the transverse direction (=stretching). These further rollers are spaced at different distances from the bottom so that the cast film has a meandering course. These additional rollers can also have different rotational speeds and/or different temperatures.

To ensure that the plastic melt adheres particularly well to the chill roll, an electrostatic contact system is used. Corresponding electrodes are spaced apart from the chill roll and a voltage of several thousand volts is applied. The applied electrical voltage aligns the dipoles within the plastic melt. The chill roll is electrically grounded accordingly so that the plastic melt is pressed against the chill roll. To prevent an electrical flashover from the electrode arrangement to the grounded chill roll, an insulator is fitted in the area not covered by the plastic melt. This insulator must, however, be regularly readjusted. The plastic melt itself, on the other hand, acts as an insulator, i.e. as a dielectric between the electrode arrangement and the grounded chill roll. During operation itself, the width over which the plastic melt extends on the chill roll (along the longitudinal direction of the chill roll) can change. Such a change already occurs when the plastic melt is extracted from the slot die. The plastic melt has a smaller width than the slot die. This difference in width is also referred to as neck-in (the plastic melt contracts slightly after exiting the slot die).

Such an adjustment, which must be carried out both during operation and when the line is restarted, is often forgotten. This can then cause the electrical flashover from the electrode to the chill roll described above. On the one hand, these flashovers damage the surface of the chill roll and, on the other hand, cause a reduced lifespan of the high-voltage generation device.

Such a manual readjustment is time-consuming and susceptible to faults. Particularly when the line speed is increased, the neck-in increases and readjustment must be carried out very quickly.

A pinning electrode arrangement is known from WO 2009/127197 A2. After the molten plastic has been discharged onto the casting roll, an attempt is made to press the molten plastic onto the casting roll as well as possible. The higher the electrical charge on the film surface, the more successful this is. The edge regions of the plastic melt should also be pressed onto the casting roll. For this purpose, WO 2009/127197 A2 proposes in all embodiments the use of brushes whose bristles consist of thin metal wires or carbon filaments and are electrically conductive. These bristles are directed in the direction of the plastic melt. In order to remove impurities from these bristles, corresponding air channels are provided in the electrode arrangement into which compressed air is blown which exits above the bristles. The use of these brushes is mandatory in WO 2009/127197 A2. These brushes should be pivotable and movable parallel to the longitudinal axis of the casting roll. The movable brushes are intended to ensure that the brushes are always located above the molten plastic and that there are no flashovers to the casting roll. Although the use of an isolator assembly between the brush and the plastic melt is mentioned in an embodiment in WO 2009/127197 A2, it proves to be very disadvantageous in practice because it causes the bristles to bend over and break off. The broken bristles often fall onto the plastic melt and contaminate it. WO 2009/127197 A2 therefore proposes twisting the brush around an axis of rotation. The design described in WO 2009/127197 A2 therefore entails a whole series of disadvantages.

In DE 23 24 345 C2, it is explained that the neck-in changes in relation to the speed of rotation of the chill roll and thus to the linear speed of the cast film. A potentiometer, which is coupled to a drive of the chill roll, generates a corresponding reference voltage that corresponds to the rotational speed. Another potentiometer is located at the drive of an adjustment unit for an isolator assembly. If both voltages are approximately equal, the isolator assembly is not moved any further (e.g. towards or away from the edge region). However, if the speed of the chill roll drive changes, the corresponding reference voltage of the potentiometer also changes. The drive of the adjustment unit now moves the isolator assembly in the corresponding direction until both voltages are approximately equal again.

However, it is problematic that the neck-in of the plastic melt is not only proportional to the linear speed of the cast film, but also depends on many other factors. For example, the neck-in depends on the extruder output, the film thickness and the actual starting material. In particular, the viscosity of the extruded starting material significantly influences the neck-in of the film.

The fact that these exemplary factors all have an influence on the neck-in means that, in the event of a product change (i.e. a different film is produced with, for example, a different layer structure, different material, different film thickness, etc.), it cannot be guaranteed that the neck-in will continue to be proportional to the linear speed of the cast film. In this case, electrical flashovers and associated damage to the chill roll and the high-voltage generation device can again occur.

U.S. Pat. No. 3,982,863 is also known from the same patent family to which DE 23 24 345 C2 belongs. This publication also shows the use of sensors which determine the width of the cast film after it has been released from the chill roll. The isolator assembly is moved according to this width.

A disadvantage, however, is that the system has a certain inertia and cannot react immediately to a change in the neck-in. Thus, in turn, electrical flashovers and thus damage can occur.

It is therefore the object of the present invention to provide a line for producing a cast film and a corresponding film stretching unit comprising such a line, by means of which it is possible to detect changes in the neck-in in such a way that a corresponding insulator assembly can be adjusted before an electrical flashover occurs and an electrical flashover can be reliably avoided.

The object is solved by the inventive line for producing a cast film according to the pending claims and by the film stretching unit with a corresponding line for producing a cast film according to the pending claims, which describe advantageous embodiments of the line for producing a cast film according to the invention.

The line for producing a cast film for a film stretching unit according to the invention comprises a slot die, a chill roll, with a chill roll shell extending between two opposite end faces of the chill roll, an electrode assembly, a high voltage generating device, an insulator assembly, a sensor device, and a control device. The slot die is configured to output a plastic melt onto an impingement area of the surface of the rotating chill roll, thereby forming a cast film. The cast film can be removed from the surface of the chill roll at a removal area of the chill roll, which is offset from the impingement area in the direction of rotation of the chill roll. The cast film can then be fed to further stages of a film stretching unit. The electrode assembly is arranged between the impingement area and the removal area of the chill roll. It runs at a distance from the surface of the chill roll and preferably parallel to the longitudinal axis of the chill roll, at least along a part of the length of the chill roll between the two end faces of the chill roll. The high-voltage generation device is configured to generate a high voltage and apply it to the electrode assembly. DC voltages of 3000 to 15000 volts or up to 30000, 40000 or 50000 volts are possible. The voltage can be changed depending on the material or the speed of rotation of the chill roll. The impingement area and the removal area are preferably arranged in such a way that the cast film is in contact with the chill roll preferably over more than 30%, 40%, 50% or more than 60% but preferably over less than 80% of its circumferential surface. Particularly preferably, the cast film lies against the chill roll over a partial circumferential area of the chill roll with a partial angle of more than 120°, 130°, 140°, 150°, 160°, 170°, 180°, 190°, 200°, 210°, 230° or more than 240° but preferably of less than 320°, 310°, 300°, 290° or less than 280°.

The insulator assembly is displaceably arranged between the electrode assembly and the chill roll shell of the chill roll. The sensor device is configured to continuously determine the left and right cast film edges (or the width of the cast film). In order to avoid voltage flashovers between the electrode assembly and the chill roll, the control device is configured to move the insulator assembly on the basis of the detected left cast film edge and the detected right cast film edge in such a way that the insulator assembly is located between the left end face of the chill roll and the left cast film edge and between the right end face of the chill roll and the right cast film edge. In particular, the area of the cast film between the left cast film edge and the right cast film edge towards the electrode assembly is free of the insulator assembly. This allows the electric field to act over almost or the entire width of the cast film. The sensor area of the sensor device is arranged downstream of the slot die in the discharge direction of the cast film and upstream of the electrode assembly. This means that, relative to the movement direction of the cast film, the sensor area is located between the slot die and the electrode assembly.

It is particularly advantageous that a sensor device is configured to detect or determine the left and right cast film edges and to move the insulator assembly accordingly as a function of this detection result, so that the insulator assembly is always located between the electrode assembly and that part of the chill roll shell of the chill roll which is not covered by the cast film. Since the sensor area is located in front of the electrode assembly, changes in the neck-in are detected at an early stage so that the insulator assembly is always optimally adjusted and thus optimally positioned and voltage flashovers are prevented.

In an embodiment according to the invention, the insulator assembly comprises a left insulator element and a right insulator element (separate from the left insulator element). The left insulator element is movable from the left end face of the chill roll towards the center of the chill roll and vice versa, whereas the right insulator element is movable from the right end face of the chill roll towards the center of the chill roll and vice versa. In a preferred embodiment, the sensor device comprises an optical sensor device. The sensor device also preferably comprises a left sensor arrangement and a right sensor arrangement. The left sensor arrangement is configured to detect the left cast film edge and the right sensor arrangement is configured to detect the right cast film edge.

In a preferred embodiment, both the left and right sensor arrangements each comprise a first IR sensor and a second IR sensor. The sensor areas of the first and second IR sensors of the left sensor arrangement are offset from one another in the longitudinal direction of the chill roll, with the sensor area of the second IR sensor of the left sensor arrangement being arranged closer to the left end face of the chill roll than the sensor area of the first IR sensor of the left sensor arrangement. The first IR sensor of the left sensor arrangement can also be referred to as the inner sensor and the second IR sensor can also be referred to as the outer IR sensor. The same applies to the sensor areas of the first and second IR sensor of the right sensor arrangement.

Preferably, the sensor areas of the first IR sensor and the second IR sensor of the respective sensor arrangement are arranged without overlapping or predominantly without overlapping (e.g., more than 70%, 80% or more than 90%) with respect to each other. Preferably, the sensor areas of the first and second IR sensor are point-shaped sensor areas. It is desirable that the spread of the sensor beam is as small as possible. The sensor beam of the respective IR sensors should impinge on the surface of the chill roll in such a way that the best possible reflection back to the respective IR sensor is possible. Good values have been obtained in particular for angles of 85° to 125°, especially for 90°.

In a further preferred embodiment, the left sensor arrangement is moved synchronously with the left insulator element and the right sensor arrangement is moved synchronously with the right insulator element. The distance between the first and the second IR sensor of the respective sensor arrangement is preferably constant during operation.

In a preferred embodiment, the control device is configured to detect the measured values of the first and second IR sensors of the left sensor arrangement and the measured values of the first and second IR sensors of the right sensor arrangement. Depending on these measured values, the control device can move the respective left or right insulator element in the direction of the center of the chill roll or away from the center of the chill roll or leave it unchanged in its position. The left insulator element and the right insulator element are each moved by a motor unit, which in turn can be controlled by the control device. The control device is configured, in particular in an operating state (the line produces a cast film), to move the left insulator element in the direction of the center of the chill roll if the measured values of the first and second IR sensors of the left sensor arrangement are below a first temperature threshold. The first temperature threshold is preferably set so that it is (slightly) above the temperature of the chill roll but below the temperature of the cast film. In this case, both IR sensors of the left sensor arrangement detect the temperature of the chill roll and the control device moves the insulator element further in the direction of the center of the chill roll. The IR sensors move synchronously with the insulator element and detect different areas on the chill roll, including the cast film. The same applies here to the right insulator element, which is also moved in the direction of the center of the chill roll if the measured values of the first and second IR sensors of the right sensor arrangement are below the first temperature value.

Conversely, the left insulator element is moved in the direction of the left end face of the chill roll if the measured values of the first and second IR sensors of the left sensor arrangement are above a second temperature threshold. This second temperature threshold is (just) below the temperature of the cast film in the normal range, i.e. outside the edge region. In this case, the control device knows that the left insulator element protrudes too far beyond the cast film and moves it further in the direction of the left end face of the chill roll so that the electric field also acts on the outer left region of the cast film, i.e. on the left edge region of the cast film, and can align the dipoles there accordingly. The same applies to the right insulator element, which in turn is moved in the direction of the right end face of the chill roll when the measured values of the first and second IR sensors of the right sensor arrangement are above the second temperature threshold.

Complementarily or alternatively, the control device is configured to leave the left insulator element in its position when a measured value of the first IR sensor of the left sensor arrangement deviates from a measured value of the second IR sensor of the left sensor arrangement by a predetermined threshold value. For example, one of these sensors detects the normal region of the cast film and another sensor detects the edge region (which is warmer than the normal region) or the chill roll (which is colder than the normal region). Such deviating measurement results are then interpreted by the control device in such a way that the left insulator element has reached its optimum position. The same applies to the right insulator element. It also remains in position if a measured value of the first IR sensor of the right sensor arrangement deviates from a measured value of the second IR sensor of the right sensor arrangement by more than a predetermined threshold value.

In another embodiment of the line according to the invention, the sensor arrangement comprises a camera that is arranged and configured to be directed to an area of the chill roll that is located between the impingement area of the molten plastic and the electrode assembly and that records the entire width of the cast film. The control device is configured to use these images to continuously determine the left and right cast film edges and to move the left and right insulator elements accordingly depending on the width of the cast film (e.g. further towards the center of the chill roll or further towards the left or right end face of the chill roll). It would also be possible for the camera to be directed at an area between the slot die and the impingement area of the molten plastic on the chill roll. In this case, the camera would work with a transmitted light measurement and record the width of the cast film in the fall. A light source can still be used here to increase the contrast. The cast film would then run between the camera and the light source. The control device would again be configured to continuously determine the left and right cast film edges based on these images and move the left and right insulator elements accordingly.

In a further preferred embodiment, the camera is a camera that operates in visible light or a camera that operates in the infrared range. It can also be a line scan camera, which records the entire width of the cast film, but only provides a certain amount of information regarding the height of the cast film (perpendicular to the width), or it can be an area scan camera. The camera is preferably stationary. However, it could also be arranged to movable, in particular synchronously with the movement of the left or right insulator element.

In a further embodiment of the line according to the invention, the sensor device comprises a left laser scanner and a right laser scanner. The left laser scanner is arranged in the region of the left cast film edge and is configured to measure the distance to the cast film and/or a thickness of the cast film, with the control device being configured to continuously determine the left cast film edge on the basis of this measurement result. The same applies to the right laser scanner with respect to the right cast film edge. In this case, it is sufficient if the left laser scanner and the right laser scanner are arranged stationary.

In another embodiment of the line according to the invention, the sensor device comprises a left laser rangefinder and a right laser rangefinder. The left laser rangefinder is arranged at a distance from the chill roll and aligned such that a laser beam runs parallel to the surface of the chill roll and impinges on the left edge region of the cast film, wherein the left laser rangefinder is configured to measure a distance to the left edge region of the cast film, and wherein the control device is configured to continuously determine the left cast film edge based on this measurement result. Depending on the measured distance, the left insulator element is moved further towards the end face of the chill roll or further towards the center of the chill roll. The same applies to the right laser rangefinder with respect to the right cast film edge.

In a preferred embodiment, the sensor arrangement comprises a protective glass and/or attachment lens that is arranged in front of the sensor surface and protects the sensor surface from contamination. This applies in particular with regard to the fact that oligomers can evaporate from the extruded cast film. These protective glasses and/or attachment lenses can be screwed onto the sensor surface in particular and can be easily replaced. They also prevent fogging of the sensor surface and thus sensor failure and/or false triggering.

Furthermore, the sensor arrangement preferably comprises a housing in which the sensor technique is incorporated or integrated. The housing can be cooled by a cooling device, whereby the sensor device can be arranged particularly close to the chill roll.

The film stretching unit according to the invention comprises a corresponding line for producing a cast film.

Figure 2:
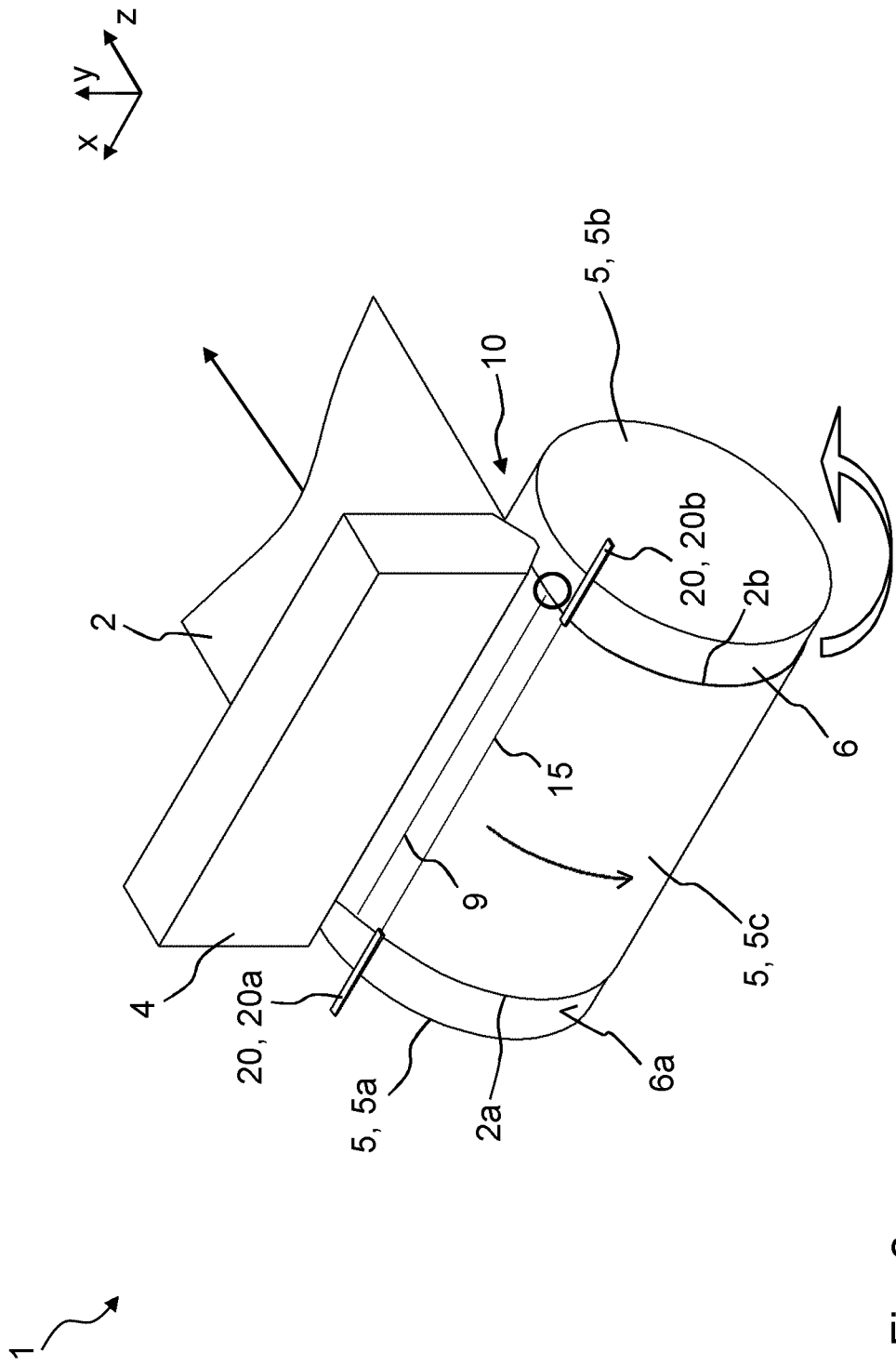
Figure 3A:
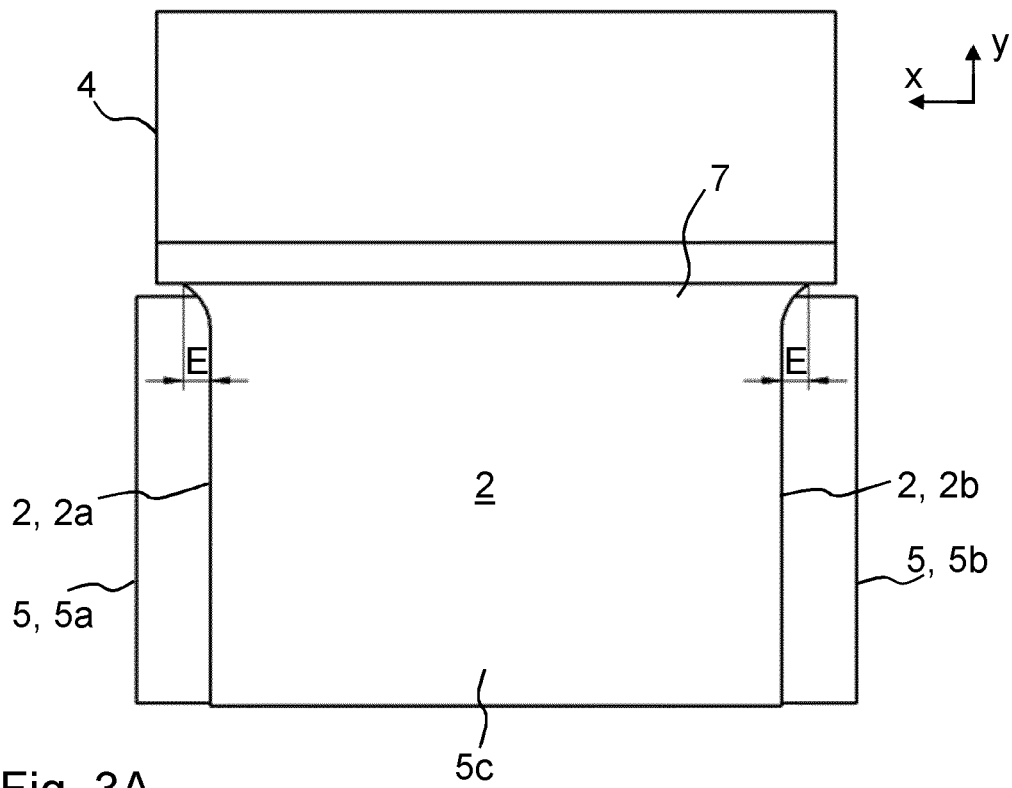
Figure 3B:
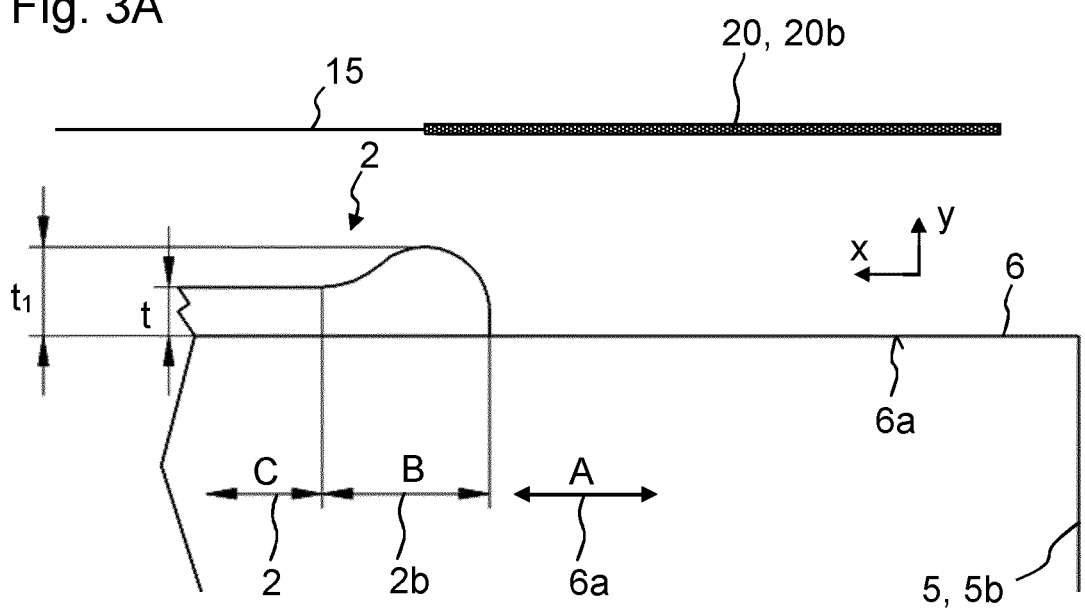
Figure 3C:
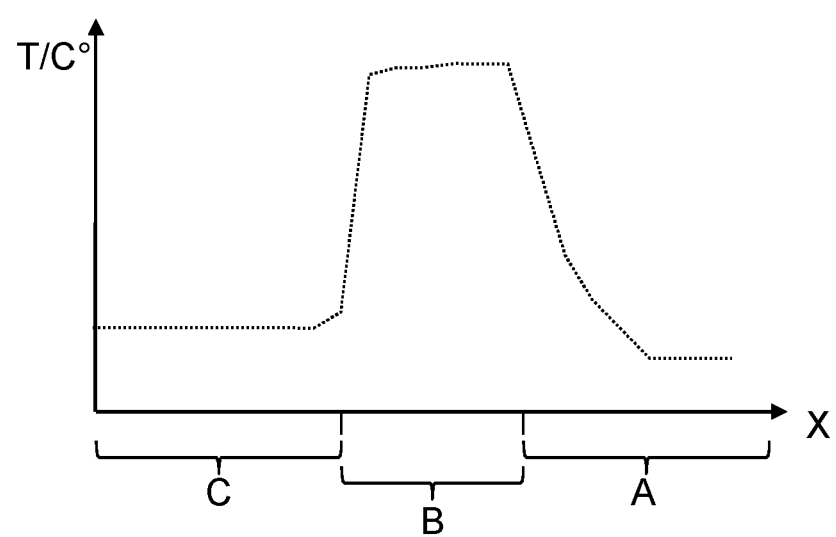
Figure 4:
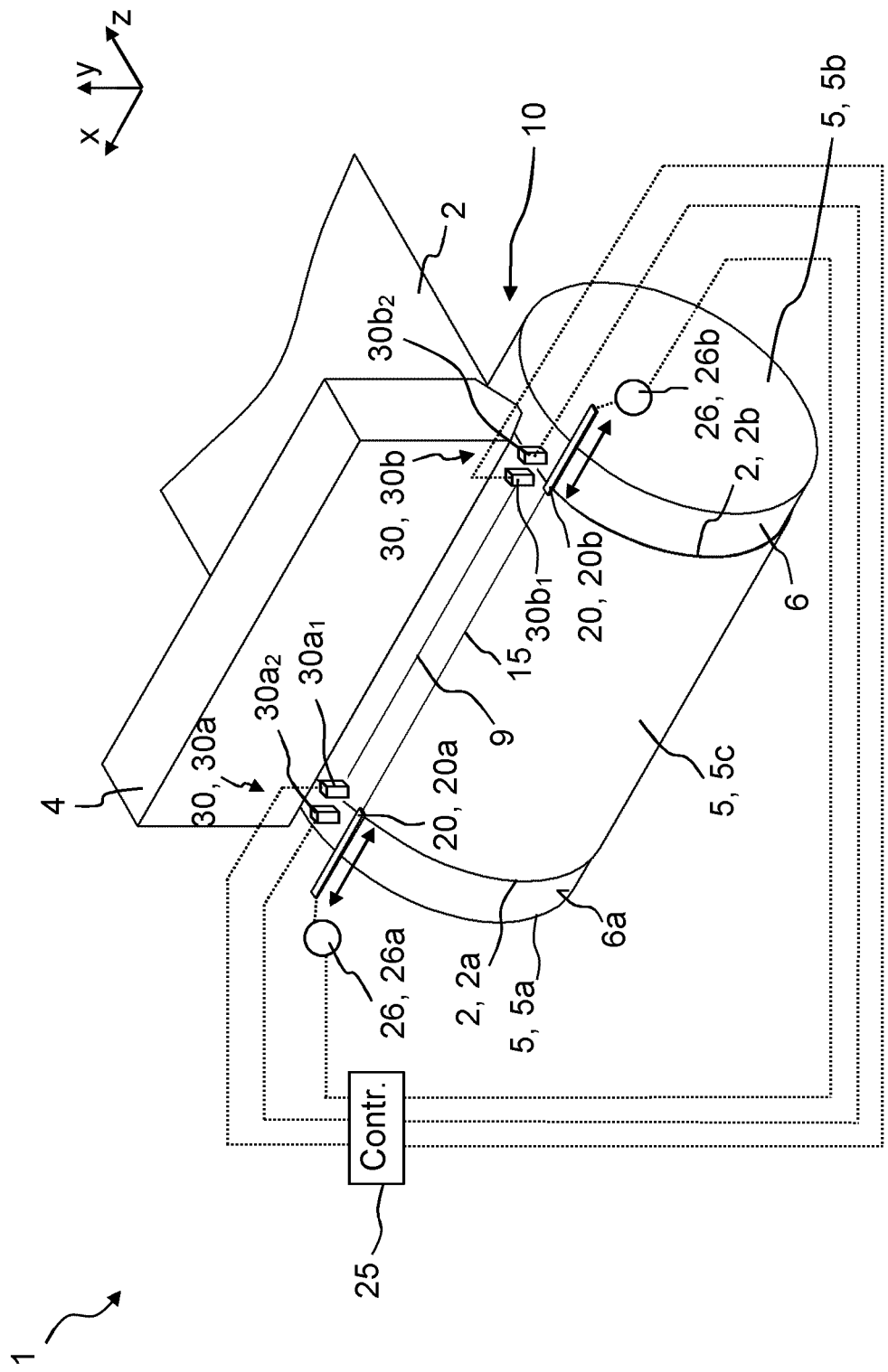
Figure 6A:
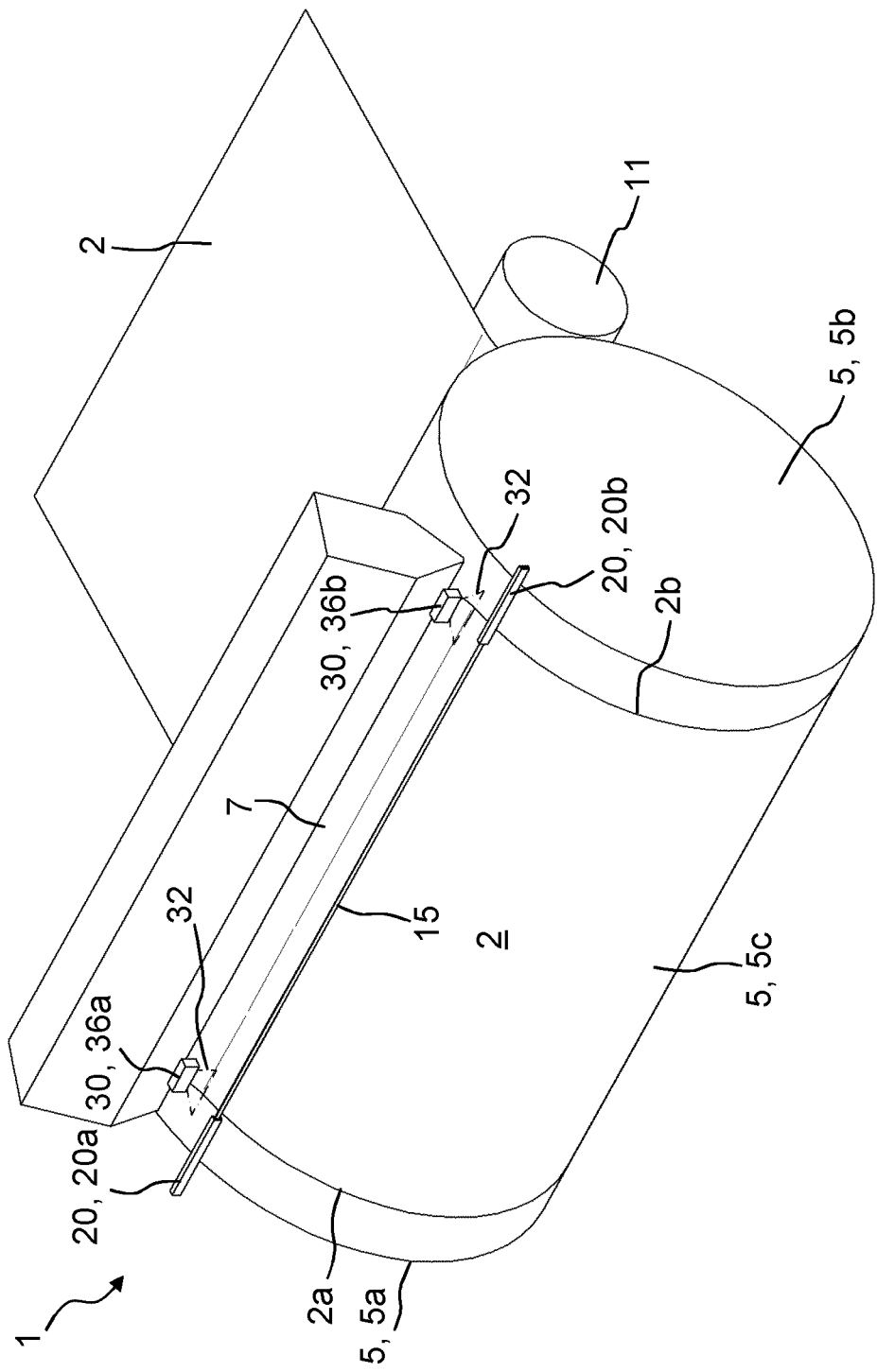
Figure 6B:
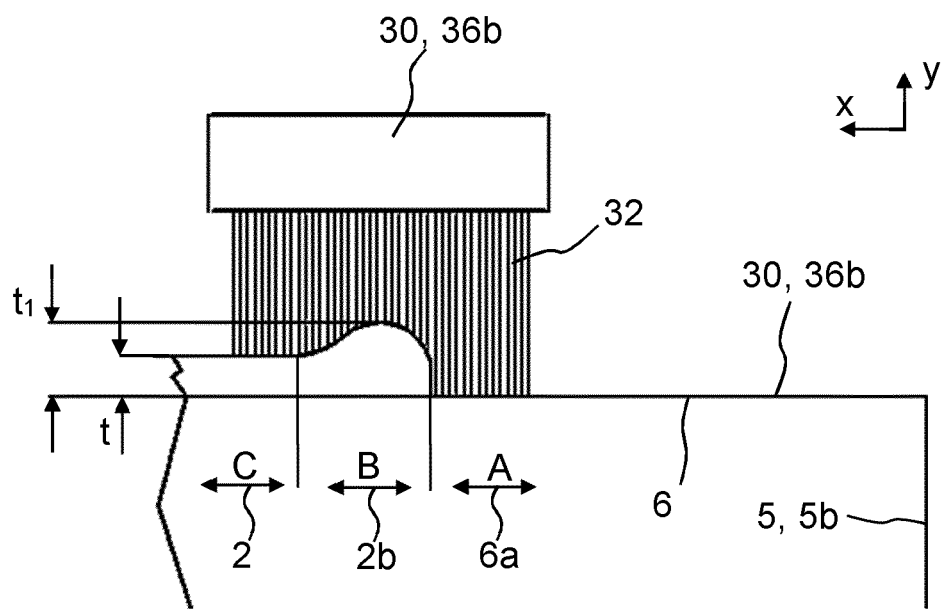
Figure 6C:
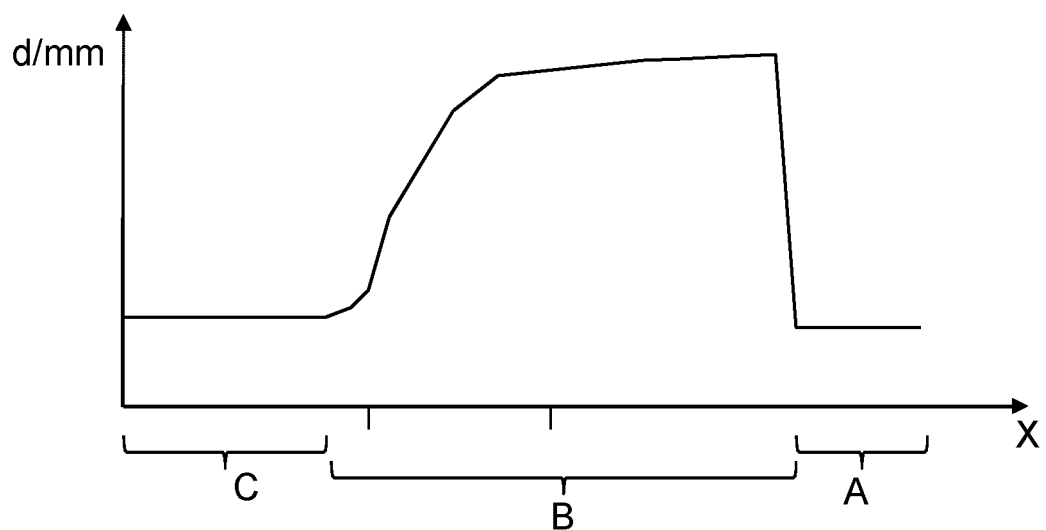
Figure 7:
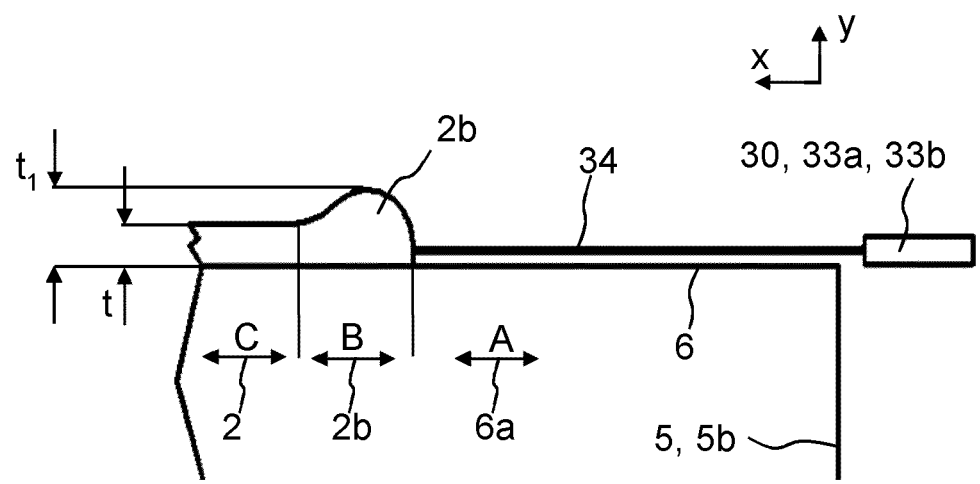
Figure 8A:
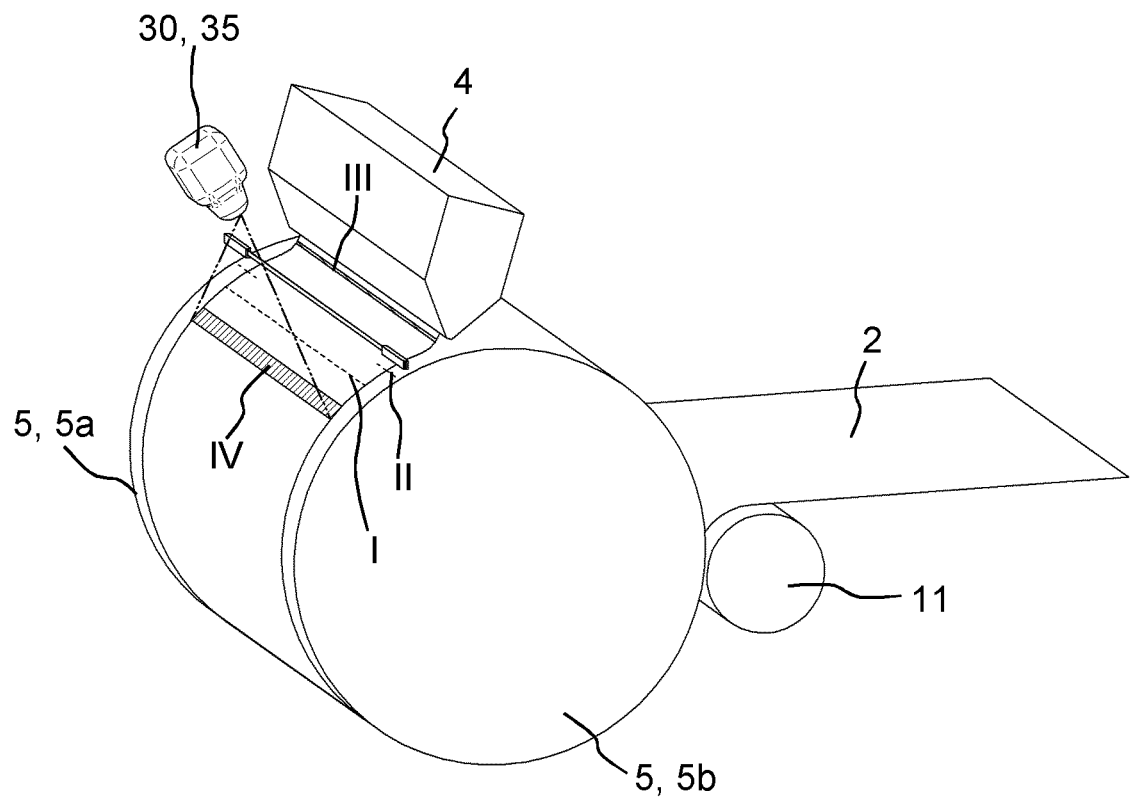
Figure 8B:
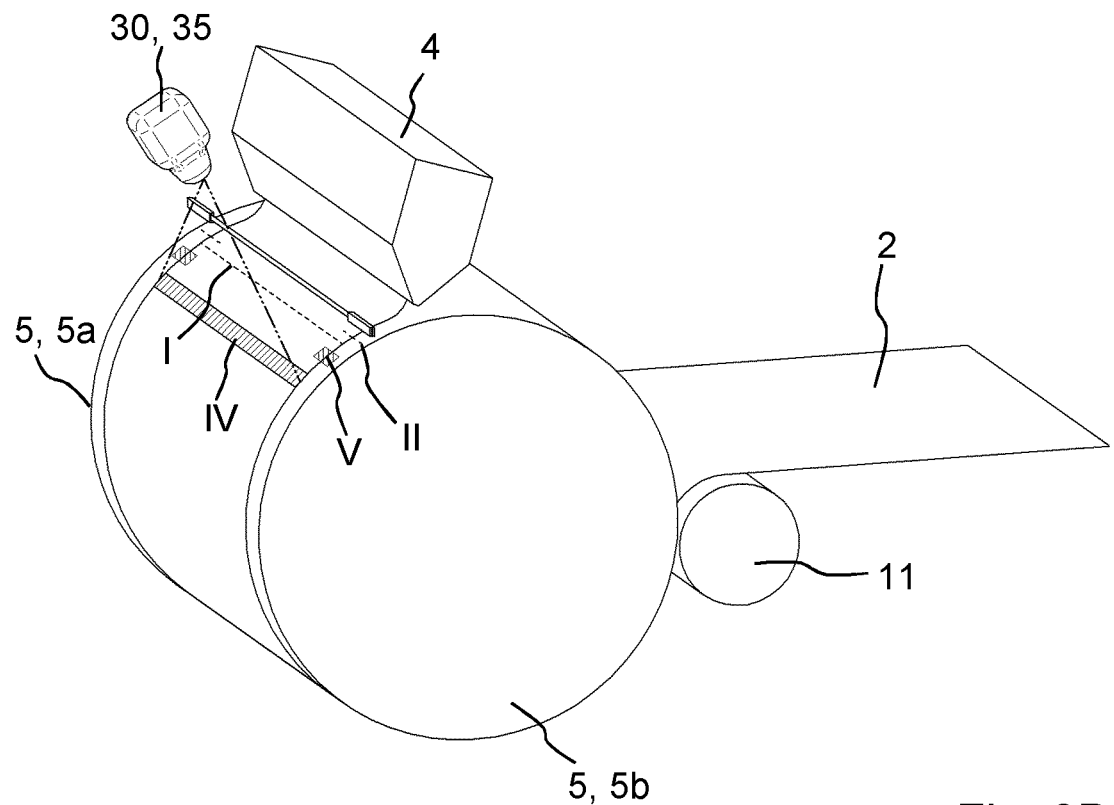
Figure 9:
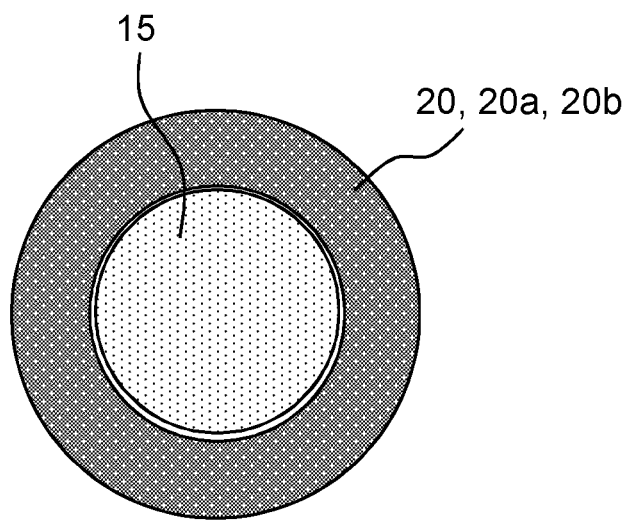

Various embodiments of the invention are described below by way of example with reference to the drawings. Identical subjects-matter have the same reference signs. The corresponding figures of the drawings show in detail:

FIG. 1: an overview of a film stretching unit comprising the line for producing a cast film according to the invention;

FIG. 2: a part of the line for producing a cast film according to the invention;

FIGS. 3A, 3B, 3C: examination results describing the properties of a cast film edge in more detail;

FIG. 4: the line for producing a cast film according to the invention with a sensor device of a first type;

FIGS. 5A, 5B, 5C, 5D: different embodiments of the sensor device of FIG. 4 in the form of two IR sensors arranged offset from each other;

FIGS. 6A, 6B, 6C: various further embodiments of the sensor device in the form of a laser scanner;

FIG. 7: another embodiment of the sensor device in the form of a laser rangefinder;

FIGS. 8A, 8B: various embodiments of the sensor device in the form of cameras; and FIG. 9: a cross-section through a tubular insulator element with inserted electrode assembly.

FIG. 1 shows a conventional line 1 for producing a cast film 2, which is part of a film stretching unit 3. In the embodiment shown in FIG. 1, the film stretching unit 3 is a simultaneous stretching unit. However, the invention is also applicable to other types of stretching units such as sequential stretching units. The line 1 according to the invention for producing the cast film 2 is arranged at the start of the film stretching unit 3 and comprises a slot die 4 (see FIG. 2) and a chill roll 5. The chill roll 5 comprises two opposite end faces 5a, 5b, between which the chill roll shell 6 extends.

The slot die 4 is configured to dispense a plastic melt 7 (see FIGS. 3A and 6A) onto an impingement area 9 of a surface 6a of the rotating chill roll 5, thereby forming the cast film 2.

At a removal area 10 of the chill roll 5, which is offset from the impingement area 9 in the direction of rotation of the chill roll 5, the cast film 2 can be removed from the surface 6a of the chill roll 5 and fed directly or indirectly to further systems of the film stretching unit 3.

In the example shown in FIG. 1, there is at least one further roller 11 arranged after the chill roll 4. Additional rollers may be provided which are spaced at different distances from the floor so that the cast film 2 has a meandering course.

The cast film 2 is then fed to a preheating zone 12a of the film stretching unit 3. In this preheating zone, the cast film 2 is heated to a specific temperature. Following this, there is a stretching zone 12b in which the cast film 2 is extended transversely and/or longitudinally to the movement direction, i.e. stretched. Following this, there are several post-treatment zones 12c to temper the cast film 2 accordingly. These zones are also referred to as annealing zones or relaxation zones. At one end 12d, the cast film 2 is output and wound up accordingly.

FIG. 2 shows part of the line 1 for producing the cast film 2 according to the invention. It can be seen that the plastic melt 7 is output via a slot die 4 onto an impingement area 9 of the surface 6a of the chill roll 5. In this embodiment, the chill roll 5 rotates counterclockwise.

To ensure that the cast film 2 is in optimum contact with the chill roll 5 and does not protrude from it, the dipoles in the cast film 2 are aligned accordingly by an electric field. An electrode assembly 15 is provided for this purpose, which in this case is configured as a wire or rod and is arranged between the impingement area 9 and the removal area 10 of the chill roll 5. The electrode assembly 15 runs at a distance from the surface 6a of the chill roll 5 and extends at least over a partial length of the chill roll 5 between the two end faces 5a, 5b. The electrode assembly 15 could also extend over the entire length of the chill roll 5.

Between the electrode assembly 15, which is formed of a wire or a rod, and the cast film 2, no brush is arranged, which in particular consists of or comprises an electrically conductive material. In other words, the free space between the cast film 2 and the wire or rod is free of such brush, with the wire or rod covering the cast film 2 over its entire width.

The electrode assembly 15 is free of a brush with electrically conductive bristles over the entire area in which it covers the cast film 2.

Therefore, the dipoles in the cast film 2 are preferably aligned solely or predominantly (more than 80%) by the electric field originating from the wire or rod.

A high-voltage generation device, which is not shown, is configured to generate a high voltage (DC voltage) and apply it to the electrode assembly 15. The level of the high voltage depends on the material of the cast film 2 and on the distance of the electrode assembly 15 from the cast film 2 and on the speed at which the cast film 2 is moved. The voltage can basically range from a few kV up to 30 kV, 40 kV, 50 kV, 60 kV. For example, the high voltage can be greater than 3 kV, 5 kV, 7 kV, 10 kV, 15 kV, 20 kV, 25 kV and preferably smaller than 50 kV, 40 kV, 30 kV, 20 kV, 15 kV.

The thickness of the plastic melt 7 leaving the slot die 4 can be in the thickness range of 5 µm to 5000 µm.

Depending on the material of the plastic melt 7 or the speed at which the plastic melt 7 is dispensed, the neck-in E mentioned at the beginning has a different dimension (see FIG. 3A). The neck-in E indicates the extent to which the plastic melt 7 contracts. In particular, the neck-in E is the difference between the width of the slot die 4 and the width of the cast film 2 on the surface 6a of the chill roll 5 divided by two.

This neck-in E is not only dependent on the line speed, but also on other parameters (material of cast film 2, temperature, etc.). These parameters can change during the production process.

The plastic melt 7 and thus the cast film 2 consist of a non-electrically conductive material (dielectric), so that there is no voltage flashover between the electrode assembly 15 and the area of the chill roll 5 covered by the cast film 2. Such a flashover can only occur at the transition of the left cast film edge 2a or the right cast film edge 2b to the chill roll 5.

To avoid such a flashover, the line 1 according to the invention comprises an insulator assembly 20 arranged between the electrode assembly 15 and the chill roll shell 6 of the chill roll 5. This insulator assembly 20 is arranged so that it can be moved. On the one hand, it can be moved further in the direction of the center 5c of the chill roll shell 6 of the chill roll 5 and, on the other hand, further in the direction of the respective end face 5a, 5b of the chill roll 5.

FIG. 2 shows that the insulator assembly 20 comprises a left insulator element 20a and a right insulator element 20b. The left insulator element 20a is movable from the left end face 5a of the chill roll 5 toward the center 5c of the chill roll 5 and vice versa. The right insulator element 20b is also movable from the right end face 5b of the chill roll 5 towards the center 5c of the chill roll 5 and vice versa.

Preferably, the left and right insulator elements 20a, 20b can be moved independently of each other. In the embodiment shown, the left insulator element 20a is plate-shaped and arranged between the electrode assembly 15 and the chill roll 5. However, it could also be tubular, in which case the electrode assembly 15 is preferably in the form of a ribbon, a wire or a rod and is passed through the tubular left insulator element 20a. The same may equally apply to the right insulator element 20b. The left insulator element 20a may also have a different structure than the right insulator element 20b.

Such a construction, in which the insulator element 20a, 20b is configured as a hollow section or as a tube, is shown in FIG. 9. The hollow insulator element 20a, 20b is extended through by the electrode assembly 15. The insulator element 20a, 20b can be slid over the electrode assembly 15. In this case, the electrode assembly 15 is not necessarily located in the center, but can be spaced at different distances from the inner wall of the tubular insulator element 20a, 20b due to a possible flexible configuration. A diameter of the electrode assembly 15 is smaller than an inner diameter of the insulator element 20a, 20b, so that there is preferably still a gap or cavity between a partial circumferential area of the electrode assembly 15 and the insulator element 20a, 20b. This allows the insulator element 20a, 20b to be more easily displaced. The hollow or tubular insulator element 20a, 20b may have any cross-sectional shape (e.g., angular, oval, etc.). In the embodiments, it is round. However, this need not necessarily be the case.

The insulator element 20a, 20b may also be configured in a telescopic manner.

Preferably, the insulator element 20a, 20b comprises openings only at its two end faces, from which the electrode assembly 15, formed as a wire or rod, emerges. The insulator element 20a, 20b is in particular free of a pressurized gas which is used, for example, for cooling and/or cleaning the electrode assembly 15. The air pressure inside the preferably tubular insulator element 20a, 20b preferably corresponds to the air pressure outside the tubular insulator element 20a, 20b.

The electrode assembly 15 is preferably of one-piece construction. In particular, that part of the electrode assembly 15 which extends above the cast film 2 or above the chill roll 5 is of one-piece construction. This would be the case, for example, if a wire or rod were used for the electrode assembly 15.

A distance between the electrode assembly 15 and the chill roll 5 is preferably approximately constant over the entire length of the electrode assembly 15 or the chill roll 5. Preferably, however, the distance between the electrode assembly 15 and the chill roll 5 is approximately constant over that part of the electrode assembly 15 in which the cast film 2 is arranged below the electrode assembly 15. The wording "approximately" is preferably to be understood in such a way that deviations of less than 10 mm, 8 mm, 6 mm, 4 mm or less than 2 mm fall below. If brushes are used, the distance would not be constant because there are always intermediate areas between the individual bristles of the brush.

The wire or rod of the electrode assembly 15 is preferably free of a cavity. In particular, there is no cavity within the wire or rod that extends longitudinally (and in particular extends through the wire or rod for most or all of its length). The wire or rod of the electrode assembly 15 is further preferably free of an air guiding channel.

A cross-sectional shape of a receiving channel extending longitudinally through the insulator element 20a, 20b configured as a hollow section or as a tube corresponds to a cross-sectional shape of the electrode assembly 15 or is approximated to a cross-sectional shape of the electrode assembly 15. Preferably, the cross-sectional shape of the receiving channel of the insulator element 20a, 20b is circular.

FIG. 4 also shows a control device 25. The control device 25 is configured to control a drive device 26. This drive device 26 is preferably an electric drive device 26, the actuation of which moves the insulator assembly 20 closer in the direction of the center 5c of the chill roll 5 or closer in the direction of the respective end face 5a, 5b of the chill roll 5. Preferably, the drive device 26 comprises a left drive motor 26a and a right drive motor 26b. The left drive motor 26a is operatively connected to the left insulator element 20a in such a way that, when the left drive motor 26a is actuated, the left insulator element 20a is displaced either in the direction of the center 5c of the chill roll 5 or in the direction of the left end face 5a of the chill roll 5. The right drive motor 26b, on the other hand, is operatively connected to the right insulator element 20b in such a way that, when the right drive motor 26b is actuated, the right insulator element 20b is moved either in the direction of the center 5c of the chill roll 5 or in the direction of the right end faces 5b of the chill roll 5.

Control connections between the control device 25 and the drive device 26, which comprises the left drive motor 26a and the right drive motor 26b, are shown dotted.

With regard to FIG. 3B, a cross-section through the cast film 2 and the chill roll 5 is shown.

The cast film 2 comprises a normal region C in which the thickness is approximately constant. The thickness increases towards the left and right cast film edges 2a, 2b. This left and right cast film edge 2a, 2b is also referred to as the edge region B. The surface 6a of the chill roll 5 adjoins this edge region B of the left and right cast film edge 2a, 2b. This is also referred to as chill roll region A. The edge region B of the left and right cast film edges 2a, 2b is not only thicker than the normal region C of the cast film 2, but also has a higher temperature due to its greater thickness.

FIG. 3B also shows the electrode assembly 15 and the insulator assembly 20. In the insulator assembly 20, the left and right insulator elements 20a, 20b are shown. In this embodiment, this ends approximately above the edge region B of the left and right cast film edge 2a, 2b, respectively. However, it could also extend slightly (less than 10 cm, 8 cm, 6 cm, 4 cm, 2 cm or less than 1 cm) into the normal region C of the cast film 2. It could also end less than 4 cm, 3 cm, 2 cm, 1 cm or less than 0.5 cm away from the edge region B of the left or right cast film edge 2a, 2b above the chill roll region A, i.e. above the surface 6a of the chill roll 5 not covered by the cast film 2.

The electrode assembly 15 is passed through the insulator assembly 20. In this case, the insulator assembly 20 is tubular. Reference is made to FIG. 9 and the corresponding explanations thereto.

It would also be possible, in a plan view of the electrode assembly 15, for the insulator assembly 20 to be arranged in congruence with the electrode assembly 15 over at least a partial length thereof, with the insulator assembly 20 being arranged closer to the chill roll 5 than the electrode assembly 15.

The control device 25 is configured to control the drive device 26 in such a way that the left or right insulator element 20a, 20b of the insulator assembly 20 continues to end in the edge region B of the first or second cast film edge 2a, 2b, even if the width of the cast film 2 and/or the width of the neck-in E changes.

The drive device 26, i.e. the left drive motor 26a and the right drive motor 26b are preferably stepper motors and/or servo motors.

When the line 1 is started, the control device 25 is configured to move the left and right insulator elements 20a, 20b in the direction of the center 5c of the chill roll 5.

Such an exemplary temperature curve is shown for regions A, B and C in FIG. 3C. The horizontal axis (abscissa) runs parallel to the longitudinal axis of the chill roll 5. The normal region C of the cast film 2 has a temperature which is above the temperature of the surface 6a of the chill roll 5. The edge region B of the left and right cast film edge 2a, 2b, on the other hand, has a (significantly) higher temperature compared to the normal region C. The temperature curve rises from the normal region C to the edge region B and falls again at the transition from the edge region B to the surface 6a (chill roll region A) of the chill roll 5.

In order to detect the left and right cast film edges 2a, 2b, respectively, the line 1 according to FIG. 4 comprises a sensor device 30. The sensor device 30 is configured to continuously detect the left and right cast film edges 2a, 2b. In principle, the relative position of the left and right cast film edges 2a, 2b could also be determined in relation to the chill roll shell 6 and/or in relation to the left and/or right end faces 5a, 5b of the chill roll 5, respectively. In order to avoid voltage flashovers between the electrode assembly 15 and the chill roll 5, the control device 25 is then configured to move the insulator assembly 20 on the basis of the left cast film edge 2a and the right cast film edge 2b determined by the sensor device 30 in such a way that the insulator assembly 20 is located between the left end face 5a of the chill roll 5 and the left cast film edge 2a and/or between the right end face 5b of the chill roll 5 and the right cast film edge of the chill roll 5, respectively. The dashed connection to the control device 25 again indicates that the control device 25 is in communication with the sensor device 30 for data exchange. The sensor device 30 can transmit measurement values to the control device 25.

It is particularly significant that a sensor area 31 (see FIG. 5A) of the sensor device 30 is arranged downstream of the slot die 4 in the output direction of the cast film 2 and upstream of the electrode assembly 15. The sensor device 30 is preferably also provided in this area, i.e. in the movement direction of the cast film 2 between the slot die 4 and the electrode assembly 15. This has the significant advantage that the left and right cast film edges 2a, 2b can be detected at a time before the cast film 2 passes underneath the electrode assembly 15. Because the left and right cast film edges 2a, 2b are detected or determined particularly early, it is still possible for the control device 25, in the event of a change in the neck-in E, to control the drive device 26 so quickly that the insulator assembly 20 with the left and right insulator elements 20a, 20b are moved in such a way that there is no flashover between the electrode assembly 15 and the chill roll 5 due to the changed neck-in E.

However, it would also be conceivable for the sensor area 31 of the sensor device 30 to be arranged downstream of the electrode assembly 15. In this case, the cast film 2 passes underneath the electrode assembly 15 and is only detected by the electrode assembly 15 afterwards. In particular, the left and right cast film edges 2a, 2b are again detected here. The sensor device 30 would preferably also be provided in this area. This could be one or more cameras 35, for example. In addition, further sensor devices 30 can be used here.

According to FIG. 4, the sensor device 30 comprises a left sensor arrangement 30a for detecting the left cast film edge 2a and a right sensor arrangement 30b for detecting the right cast film edge 2b.

In the embodiment shown in FIG. 4, the left sensor arrangement comprises a first IR sensor $30a_1$ and a second IR sensor $30a_2$, respectively. The right sensor arrangement 30b also comprises a first IR sensor $30b_1$ and a second IR sensor $30b_2$, respectively. The sensor areas 31 of the first and second IR sensors $30a_1$, $30a_2$ of the left sensor arrangement 30a are offset in the longitudinal direction X of the chill roll 5, and are arranged in particular predominantly or completely free of overlap with one another. The sensor area 31 of the second IR sensor $30a_2$ of the left sensor arrangement 30a is arranged closer to the left end face 5a of the chill roll 5 than the sensor area 31 of the first IR sensor $30a_1$ of the left sensor arrangement 30a. The first IR sensor $30a_1$ of the left sensor arrangement 30a may also be referred to as the inner IR sensor $30a_1$. In contrast, the second IR sensor $30a_2$ of the left sensor arrangement 30a may be referred to as the outer IR sensor $30a_2$ of the left sensor arrangement 30a. In principle, the first and second IR sensors $30a_1$, $30a_2$ of the left sensor arrangement 30a may also be arranged offset from each other overall in the longitudinal direction X of the chill roll 5.

The same applies to the first and second IR sensors $30b_1$, $30b_2$ of the right sensor arrangement 30b. These are also arranged offset to each other in the longitudinal direction of the chill roll 5, whereby the sensor area 31 of the second IR sensor $30b_2$ of the right sensor arrangement 30b is arranged closer to the right end face 5b of the chill roll 5 than the sensor area 31 of the first IR sensor $30b_1$ of the right sensor arrangement 30b. These sensor areas 31 are also preferably arranged predominantly or completely free of overlap with each other.

The sensor areas 31 of the first and second IR sensors $30a_1$, $30a_2$ and $30b_1$, $30b_2$, respectively, of the left and right sensor arrangements 30a, 30b are point-shaped sensor areas 31. The sensor areas 31 should spread out as little as possible, which is why the left and right sensor arrangements 30a, 30b should be arranged as close as possible to the chill roll 5 and the cast film 2, respectively. Preferably, these are located less than 100 cm, 80 cm, 70 cm, 50 cm, 40 cm, 30 cm, 20 cm, 10 cm or 5 cm away from the chill roll 5. However, care must be taken here to ensure that the sensor device 30 is not damaged by excessively high temperatures. In principle, the sensor device 30 and thus the left and/or right sensor arrangement 30a, 30b could have a corresponding housing which is tempered via a cooling device not shown.

The sensor beam 32 of the respective IR sensors $30a_1$, $30a_2$ and $30b_1$, $30b_2$ of the left and right sensor arrangements 30a, 30b preferably impinges on the chill roll 5 at an angle of 90°. Angles deviating from this are also conceivable. For example, the sensor beam 32 of the respective IR sensor $30a_1$, $30a_2$, $30b_1$, $30b_2$ of the left and right sensor arrangements 30a, 30b could also impinge on the surface 6a of the chill roll 5 at an angle wherein the angle is larger than 75°, 80°, 85°, 90°, 95°, 100°, 105°, 110°, 115°, 120°, 125° or 130° and wherein the angle is smaller than 140°, 135°, 130°, 125°, 120°, 115°, 110°, 105°, 100°, 95°, 90°, 85°, 80° or 75°.

Preferably, the left sensor arrangement 30a can be moved synchronously with the left insulator element 20a. The same applies to the right sensor arrangement 30b, which can preferably be moved synchronously with the right insulator element 20b. The individual IR sensors $30a_1$, $30a_2$ of the left sensor arrangement 30a are preferably not movable relative to each other. The same applies to the individual IR sensors $30b_1$, $30b_2$ of the right sensor arrangement 30b. However, the individual IR sensors $30a_1$, $30a_2$ of the left sensor arrangement 30a and/or the individual IR sensors $30b_1$, $30b_2$ of the right sensor arrangement 30b could also be moved individually with respect to each other and/or with respect to the IR sensors $30a_1$, $30a_2$, $30b_1$, $30b_2$ of the other sensor arrangement 30a, 30b. Exactly two IR sensors $30a_1$, $30a_2$ and/or $30b_1$, $30b_2$ can be used in the left and right sensor arrangements 30a, 30b. However, more than two of these IR sensors $30a_1$, $30a_2$ and/or $30b_1$, $30b_2$ could also be used. It could also be possible that only one IR sensor $30a_1$, $30a_2$, $30b_1$, $30b_2$ is used per sensor arrangement $30a$, $30b$. This would be done in particular as part of an emergency run program if another IR sensor $30a_1$, $30a_2$, $30b_1$, $30b_2$ of the respective sensor arrangement $30a$, $30b$ has failed. In the event of failure of such an IR sensor $30a_1$, $30a_2$, $30b_1$, $30b_2$, an acoustic and/or visual alarm is preferably output.

Figure 5A:
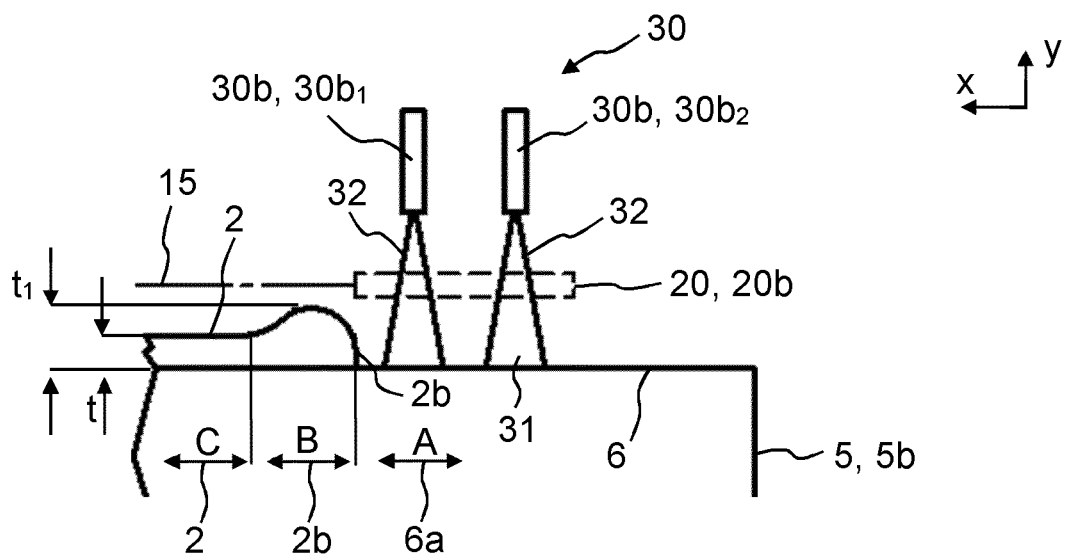

FIGS. 5A to 5D explain the operation of the line 1 for producing the cast film 2 according to the invention. The control device 25 is configured to detect the measured values of the first and second IR sensors $30a_1$ and $30a_2$ and $30b_1$, $30b_2$ of the left and right sensor arrangements $30a$, $30b$, respectively. Referring to FIG. 5A, it is shown that both IR sensors $30b_1$, $30b_2$ of the right sensor arrangement $30b$ detect a temperature of the surface $6a$ of the chill roll 5 that is not covered by the cast film 2. The IR sensors $30b_1$, $30b_2$ are arranged to move synchronously with the right insulator element $20b$. In FIG. 5A, the right insulator element $20b$ is to be moved toward the center $5c$ of the chill roll 5 because the readings of the first and second IR sensors $30b_1$, $30b_2$ of the right sensor arrangement $30b$ are below a first temperature threshold value. This first temperature threshold value is set to a temperature value that is between the temperature of the cast film 2 in the normal region C and a temperature in the chill roll region A of the chill roll 5. Therefore, the control device 25 is configured to move the right insulator element $20b$ further toward the center $5c$ of the chill roll 5.

Figure 5B:
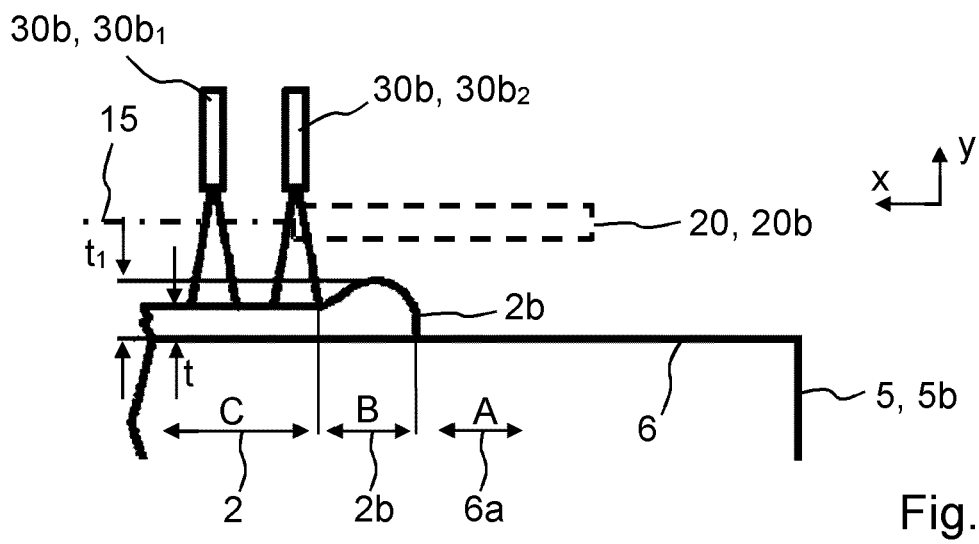

FIG. 5B shows an opposite arrangement. The first and second IR sensors $30b_1$, $30b_2$ detect the temperature of the cast film 2 in the normal range C. In this case, the control device 25 is configured to move the right insulator element $20b$ in the direction of the right end face $5b$ of the chill roll 5 because the measured values of the first and second IR sensors $30b_1$, $30b_2$ of the right sensor arrangement $30b$ are above a second temperature threshold. This second temperature threshold can be identical to the first temperature threshold. Preferably, the second temperature threshold lies above the first temperature threshold. However, the second temperature threshold value preferably also lies between the temperature at the surface $6a$ of the chill roll 5 and the temperature of the cast film 2 in its normal range C.

Figure 5C:
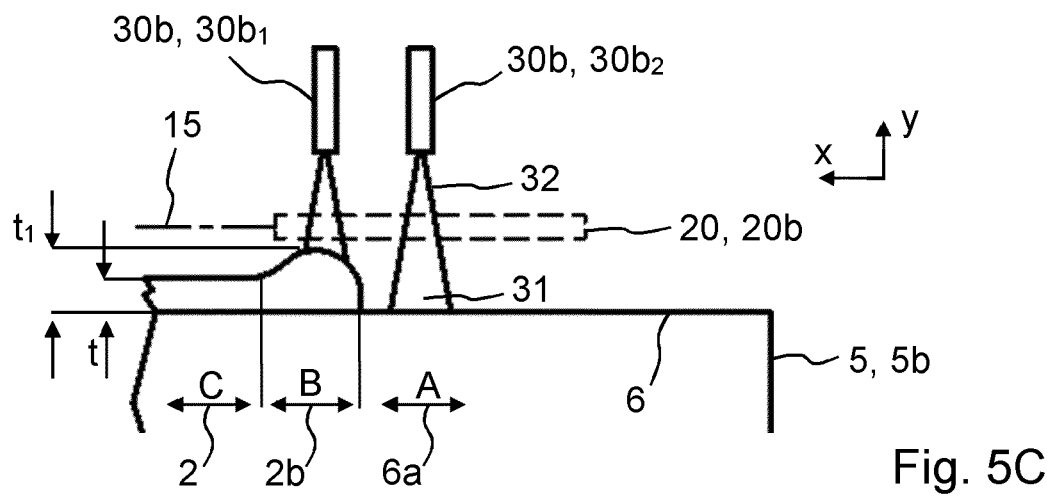

Referring to FIG. 5C, it is shown that the right insulator element $20b$ is to be left in position. This is because a measured value of the first IR sensor $30b_1$ of the right sensor arrangement $30b$ differs from a measured value of the second IR sensor $30b_2$ of the right sensor arrangement $30b$ by a predetermined threshold. In the embodiment shown, the first IR sensor $30b_1$ detects a temperature at the right cast film edge $2b$, whereas the second IR sensor $30b_2$ detects a temperature at the surface $6a$ of the chill roll 5. The right insulator element $20b$ ends approximately at the level of the right cast film edge $2b$.

Figure 5D:
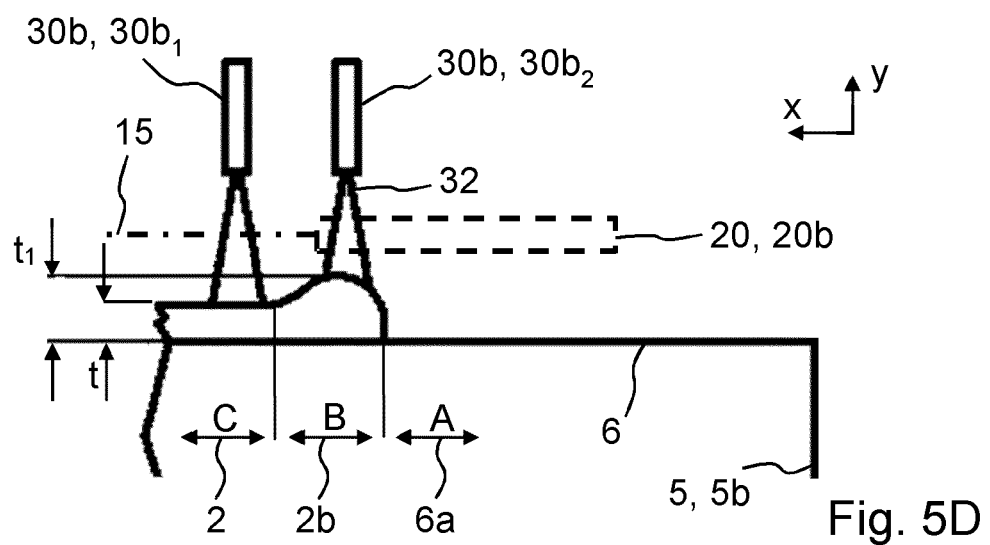

In principle, it could also be that the first IR sensor $30b_1$ detects the temperature in the normal region C of the cast film 2, whereas the second IR sensor $30b2$ detects the temperature at the right cast film edge 2. This situation is shown in FIG. 5D. Here, too, the right insulator element $20b$ can be left in its position.

The remarks provided also apply to the first and second IR sensors $30a_1$, $30a2$ of the left sensor arrangement $30a$ relative to the left cast film edge $2a$ and the left insulator element $20a$.

The first and second IR sensor $30a_1$, $30a_2$ of the left sensor arrangement $30a$ may be arranged in a common, preferably cooled, housing. The same can also apply to the first and second IR sensor $30b_1$, $30b_2$ of the right sensor arrangement $30b$.

In principle, the control device 25 is configured to leave the right insulator element $20b$ in position when a measurement value of the first IR sensor $30b1$ of the right sensor arrangement $30b$ is above the second temperature threshold but below a third temperature threshold, and when a measurement value of the second IR sensor $30b_2$ of the right sensor arrangement $30b$ is above the third temperature threshold or below the first temperature threshold. The third temperature threshold value is above the average temperature of the normal region C of the cast film 2. In particular, it is approximately midway between the temperature of the normal region C of the cast film 2 and the temperature in the respective edge region B of the cast film 2. This situation is illustrated in FIG. 5D. The control device 25 is configured to keep the right insulator element $20b$ in position even when a measurement value of the first IR sensor $30b_1$ of the right sensor arrangement $30b$ is above the third temperature threshold and when a measurement value of the second IR sensor $30b_2$ of the right sensor arrangement $30b$ is below the first temperature threshold. This situation is shown in FIG. 5C. In this case, the first IR sensor $30b_1$ measures the temperature at the right cast film edge $2b$ and the second IR sensor $30b_2$ measures the temperature of the surface $6a$ of the chill roll 5.

The remarks provided also apply to the first and second IR sensors $30a_1$, $30a2$ of the left sensor arrangement $30a$.

In summary, here, the first and second IR sensors $30a_1$, $30a_2$ of the left sensor arrangement $30a$ can measure a temperature value from either the normal region C of the cast film 2 or the edge region B of the cast film 2 or the chill roll region A of the chill roll 5. The control device 25 is configured to move the left insulator element $20a$ toward the center $5c$ of the chill roll 5 when both IR sensors $30a_1$, $30a_2$ measure the temperature of the chill roll region A, or to move the left insulator element $20a$ toward the left end face $5a$ of the chill roll 5 when both IR sensors $30a_1$, $30a_2$ measure the temperature of the normal region C of the cast film 2. If both IR sensors $30a_1$, $30a_2$ measure temperatures of different regions A, B, C, then the left insulator element $20a$ can remain in its position. The same applies to the right sensor arrangement $30b$ with both IR sensors $30b_1$, $30b2$.

FIGS. 6A, 6B, and 6C show another embodiment of the sensor device 30, which in this case comprises a left laser scanner $36a$ and a right laser scanner $36b$. The left laser scanner $36a$ is arranged in the area of the left cast film edge $2a$ and is configured to measure the distance to the cast film 2 or a thickness of the cast film 2, wherein the control device 25 is configured to continuously determine the left cast film edge $2a$ based on this measurement result and to move the left insulator element $20a$ accordingly in the direction of the center $5c$ of the chill roll 5 or away from the center $5c$ of the chill roll 5 in the direction of the left end face $5a$ of the chill roll 5.

The same applies to the right laser scanner $36b$. This is arranged in the area of the right cast film edge $2b$ and is configured to measure the distance to the cast film 2 or a thickness of the cast film 2, whereby the control device 25 is configured to continuously determine the right cast film edge $2b$.

With regard to FIG. 6B, it is shown that the edge region B of the left and/or right cast film edge $2a$, $2b$ has a higher thickness than the normal region C of the cast film 2.

Based on the measured thickness profile (along the longitudinal direction of the chill roll 5), the edge region B of the cast film 2 can be precisely determined and the left or right insulator element 20*a* or 20*b* can be moved in such a way that it comes to rest above the edge region B of the cast film 2.

FIG. 6C again shows the different thickness profile. The greatest distance to the laser scanner 32*a*, 32*b* is measured in the chill roll region A, while the smallest distance to the laser scanner 32*a*, 32*a* is measured in the edge region B. The normal region C lies in between.

The advantage of using the laser scanners 32*a*, 32*b* is that they are preferably arranged stationary. They are further preferably arranged parallel to the longitudinal axis of the chill roll 5.

FIG. 7 shows yet another embodiment of the line 1 according to the invention, in which embodiment the sensor device 30 is formed in the form of a left and a right laser rangefinder 33*a*, 33*b*. The right laser rangefinder 33*b* shown in FIG. 7 is arranged at a distance from the chill roll 5 and aligned in such a way that its laser beam 34 runs parallel to the surface 6*a* of the chill roll 5 and impinges on the right edge region B, i.e. the right cast film edge 2*b* (laterally). The right laser rangefinder 33*b* is configured to measure a distance to this right edge region B, i.e., the right cast film edge 2*b*, and transmit it to the control device 25. This is in turn configured to use this measurement result to continuously determine the right cast film edge 2*b* and, in this case, to move the right insulator element 20*b* in such a way that it comes to rest over the right cast film edge 2*b*. The advantage of using such a laser rangefinder 33*b* is that it can be arranged further away from the chill roll 5 and is therefore not exposed to high temperatures.

The remarks made for the right laser rangefinder 33*b* also apply to the left laser rangefinder 33*a*, which impinges on the left cast film edge 2*a*.

FIGS. 8A and 8B show yet another embodiment of the line according to the invention. In this case, the sensor device 30 is formed in the form of cameras 35. In a first use case I, the sensor device 30 comprises a camera 35 that is arranged and configured to be directed to an area of the chill roll 5 that is located between the impingement area 9 of the plastic melt 7 and the electrode assembly 15 and records the entire width (dotted line) of the cast film 2. The control device 25 is then configured to continuously determine the left and right cast film edges 2*a*, 2*b* based on these images. The camera 35 in this case is a line scan camera.

In a second use case II, it would also be possible for the sensor device to comprise two cameras arranged and configured such that they are respectively directed at the left cast film edge 2*a* and/or the right cast film edge 2*b*. The control device 25 is then configured to continuously determine the left cast film edge 2*a* and/or the right cast film edge 2*b* on the basis of these images. The cameras are preferably line scan cameras.

In a third use case III, it would also be possible for the camera 35 to be directed at an area between the slot die 4 and the impingement area 9 of the plastic melt 7 on the chill roll 5. In this case, it could also preferably record the entire width of the cast film 2 and be configured, for example, as a line scan camera, with the control device 25 again being configured to continuously determine the left and right cast film edges 2*a*, 2*b* on the basis of these recordings. In this case, a transmitted light measurement would preferably take place.

Again, the use of two cameras would be conceivable (not shown), with a first camera detecting the left cast film edge 2*a* by means of a transmitted light measurement and a second camera detecting the right cast film edge 2*b* by means of a transmitted light measurement.

A fourth use case IV corresponds to the first use case I. In contrast to the first use case I, the camera 35 in the fourth use case IV is an area scan camera.

A fifth use case V corresponds to the second use case II. In contrast to the second use case II, the first and second cameras 35 in the fifth use case V are area scan cameras.

The camera 35 and/or the first camera and/or the second camera are configured to operate in the wavelength range of visible light (about 400 nm to 750 nm). They could also operate in the infrared range.

The camera 35 or the first and/or the second camera can be configured as a line scan camera or as an area scan camera. They are preferably arranged stationary in the same way as the laser rangefinder 33*a*, 33*b*.

The invention is not limited to the embodiments described. Within the scope of the invention, all described and/or drawn features can be combined with each other as desired.

The invention claimed is:

1. A line for producing a cast film for a film stretching unit, comprising:
    a slot die, a chill roll with a chill roll shell extending between two opposite end faces of the chill roll, an electrode assembly, a high-voltage generation device, an insulator assembly, a sensor device and a control device are provided;
    the slot die is configured to output a plastic melt onto an impingement area of the surface of the rotating chill roll, thereby forming a cast film;
    at a removal area of the chill roll, which is arranged offset from the impingement area in the direction of rotation of the chill roll, the cast film can be removed from the surface of the chill roll and fed directly or indirectly to a film stretching unit;
    the electrode assembly is arranged between the impingement area and the removal area of the chill roll;
    the electrode assembly extends at a distance from the surface of the chill roll at least in a partial length of the chill roll between the two end faces of the chill roll;
    the high-voltage generation device is configured to generate and apply a high voltage to the electrode assembly;
    the insulator assembly is arranged between the electrode assembly and the chill roll shell of the chill roll;
    the sensor device is configured to continuously detect the left and right cast film edge;
    the control device is configured, in order to avoid voltage flashovers between the electrode assembly and the chill roll, to move the insulator assembly on the basis of the detected left cast film edge and the detected right cast film edge in such a way that the insulator assembly is arranged:
    a) between the left end face of the chill roll and the left cast film edge; and
    b) between the right end face of the chill roll and the right cast film edge; and
    a sensor area of the sensor device is provided downstream of the slot die and upstream of the electrode assembly in the output direction of the cast film, and wherein
    the insulator assembly comprises a left insulator element and right insulator element;
    the left insulator element is movable from the left end face of the chill roll toward the center of the chill roll and vice versa;
    the right insulator element is moveable from the right end face of the chill roll toward the center of the chill roll and vice versa;

the sensor device comprises a left sensor arrangement for detecting the left cast film edge and a right sensor arrangement for detecting the right case film edge;

the left sensor arrangement is movable synchronously with the left insulator element, and the right sensor arrangement is movable synchronously with the right insulator element.

2. The line according to claim 1, wherein:

the left and right insulator element are movable independently of each other;

the left insulator element is:

a) tubular, wherein the electrode assembly in the form of a ribbon, a wire or a rod passes through the tubular left insulator element;

and the right insulator element is:

a) tubular, wherein the electrode assembly in the form of a ribbon, a wire or a rod passes through the tubular right insulator element.

3. The line according to claim 1, wherein:

the control device is configured to move the left and right insulator element in the direction of the center of the chill roll when the line is started.

4. The line according to claim 1, wherein:

the left and right sensor arrangements each comprise a first IR sensor and a second IR sensor;

the sensor areas of the first and second IR sensors of the left sensor arrangement are arranged offset from one another in the longitudinal direction of the chill roll, the sensor area of the second IR sensor of the left sensor arrangement being arranged closer to the left end face of the chill roll than the sensor area of the first IR sensor ($30a_1$) of the left sensor arrangement;

the sensor areas of the first and second IR sensors of the right sensor arrangement are arranged offset from one another in the longitudinal direction of the chill roll, the sensor area of the second IR sensor of the right sensor arrangement being arranged closer to the right end face of the chill roll than the sensor area of the first IR sensor of the right sensor arrangement.

5. The line according to claim 4, wherein:

the sensor area of the first IR sensor of the left sensor arrangement is arranged without overlapping with the sensor area of the second IR sensor of the left sensor arrangement;

the sensor area of the first IR sensor of the right sensor arrangement is arranged without overlapping with the sensor area of the second IR sensor of the right sensor arrangement.

6. The line according to claim 4, wherein:

a sensor beam of the respective IR sensor of the left and the right sensor arrangement impinges on the surface of the chill roll at an angle, wherein the angle is between 75° and 140°.

7. The line according to claim 4, wherein:

the control device is configured to detect the measurement values of the first and second IR sensor of the left sensor arrangement and the measurement values of the first and second IR sensor of the right sensor arrangement;

the control device is configured to:

a) move the left insulator element toward the center of the chill roll when the measurement values from the first and second IR sensor of the left sensor arrangement are below a first temperature threshold; and/or move the right insulator element toward the center of the chill roll when the measurement values from the first and second IR sensor of the right sensor arrangement are below the first temperature threshold;

and/or b) move the left insulator element toward the left end face of the chill roll when the measurement values from the first and second IR sensor of the left sensor arrangement are above a second temperature threshold; and/or move the right insulator element toward the right end face of the chill roll when the measurement values from the first and second IR sensor of the right sensor arrangement are above the second temperature threshold;

and/or c) leave the left insulator element in position when a measurement value of the first IR sensor of the left sensor arrangement differs from a measurement value of the second IR sensor of the left sensor arrangement by a predetermined limit value; and/or leave the right insulator element in position when a measurement value of the first IR sensor of the right sensor arrangement differs from a measurement value of the second IR sensor of the right sensor arrangement by a predetermined limit value.

8. The line according to claim 7, wherein:

the control device is configured to leave the left insulator element in position if:

a) a measurement value of the first IR sensor of the left sensor arrangement is above the second temperature threshold and below a third temperature threshold, and if a measurement value of the second IR sensor of the left sensor arrangement is above the third temperature threshold or below the first temperature threshold; or b) a measurement value of the first IR sensor of the left sensor arrangement is above the third temperature threshold, and if a measurement value of the second IR sensor of the left sensor arrangement is below the first temperature threshold;

and/or the control device is configured to leave the right insulator element in position if:

a) a measurement value of the first IR sensor of the right sensor arrangement is above the second temperature threshold but below a third temperature threshold, and if a measurement value of the second IR sensor of the right sensor arrangement is above the third temperature threshold or below the first temperature threshold; or b) a measurement value of the first IR sensor of the right sensor arrangement is above the third temperature threshold, and if a measurement value of the second IR sensor of the right sensor arrangement is below the first temperature threshold.

9. The line according to claim 4, wherein:

the control device is configured to detect the measurement values of the first and second IR sensor of the left sensor arrangement and the measurement values of the first and second IR sensor of the right sensor arrangement, wherein the respective IR sensors are configured to measure a temperature of a normal region (C) of the cast film (2), a temperature of an edge region (B) of the cast film (2), and a temperature of a chill roll region (A) of the chill roll;

the control device is configured to:

a) move the left insulator element toward the center of the chill roll if the first and second IR sensor of the left sensor arrangement measure the temperature of the chill roll region (A); and/or move the right insulator element toward the center of the chill roll if the first and second IR sensor of the right sensor arrangement measure the temperature of the chill roll region (A);
and/or
b) move the left insulator element toward the left end face of the chill roll if the first and second IR sensor of the left sensor arrangement measure the temperature of the normal region (C); and/or
move the right insulator element toward the right end face of the chill roll if the first and second IR sensor of the right sensor arrangement measure the temperature of the normal region (C);
and/or
c) leave the left insulator element in position if the first and second IR sensor of the left sensor arrangement measure temperatures of different regions (A, B, C); and/or
leave the right insulator element in position if the first and second IR sensor of the right sensor arrangement measure temperatures of different regions (A, B, C).

10. The line according to claim 1, wherein:
the sensor device comprises a camera which is arranged and configured in such a way that it:
a) is directed towards an area of the chill roll which lies between the impingement area of the plastic melt and the electrode assembly and records the entire width of the cast film, wherein the control device is configured to continuously determine the left and right cast film edges on the basis of these recordings; or
b) is directed at an area between the slot die and the impingement area of the plastic melt on the chill roll and records the entire width of the cast film, wherein the control device is configured to continuously determine the left and right cast film edges on the basis of these recordings.

11. The line according to claim 1, wherein:
the sensor device comprises two cameras;
the first camera is arranged and configured in such a way that it
a) is directed towards an area of the chill roll which lies between the impingement area of the plastic melt and the electrode assembly and records an area at the left cast film edge, wherein the control device is configured to continuously determine the left cast film edge on the basis of these recordings; or
b) is directed towards an area between the slot die and the impingement area of the plastic melt on the chill roll and records an area at the left cast film edge, wherein the control device is configured to continuously determine the left cast film edge on the basis of these recordings;
and
the second camera is arranged and configured in such a way that it
a) is directed towards an area of the chill roll which lies between the impingement area of the plastic melt and the electrode assembly and records an area at the right cast film edge, wherein the control device is configured to continuously determine the right cast film edge on the basis of these recordings; or
b) is directed towards an area between the slot die and the impingement area of the plastic melt on the chill roll and records an area at the right cast film edge, wherein the control device is configured to continuously determine the right cast film edge on the basis of these recordings.

12. The line according to claim 1, wherein:
the sensor device comprises a left laser scanner and a right laser scanner;
the left laser scanner is arranged in the region of the left cast film edge and is configured to measure the distance to the cast film or a thickness of the cast film, wherein the control device is configured to continuously determine the left cast film edge on the basis of this measurement result;
the right laser scanner is arranged in the region of the right cast film edge and is configured to measure the distance to the cast film or a thickness of the cast film, wherein the control device is configured to continuously determine the right cast film edge on the basis of this measurement result.

13. The line according to claim 1, wherein:
the sensor device comprises a left laser rangefinder and a right laser rangefinder;
the left laser rangefinder is arranged at a distance from the chill roll and aligned in such a way that its laser beam runs parallel to the surface of the chill roll and impinges on the left cast film edge, wherein the left laser rangefinder is configured to measure a distance to the left cast film edge, and wherein the control device is configured to continuously determine the left cast film edge on the basis of this measurement result;
the right laser rangefinder is arranged at a distance from the chill roll and aligned in such a way that its laser beam runs parallel to the surface of the chill roll and impinges on the right cast film edge, wherein the right laser rangefinder is configured to measure a distance to the right cast film edge, and wherein the control device is configured to continuously determine the right cast film edge on the basis of this measurement result.

14. The line according to claim 1, wherein:
the sensor device comprises a protective glass or attachment lens disposed in front of the sensor surface and protecting the sensor surface from contamination.

15. The line according to claim 1, wherein:
the sensor device comprises a housing, wherein the housing is coolable by a cooling means.

16. A film stretching unit comprising the line for producing a cast film constructed according to claim 1.

* * * * *